US008061251B2

(12) United States Patent
Hetcher et al.

(10) Patent No.: US 8,061,251 B2
(45) Date of Patent: *Nov. 22, 2011

(54) MITER ADJUSTMENT ASSEMBLY FOR A SAW

(75) Inventors: Jason D. Hetcher, Waukesha, WI (US); Mark D. Willer, Brookfield, WI (US); William A. Elger, West Bend, WI (US); Harold L. Papenfuss, Menomonee Falls, WI (US); Daryl S. Richards, Sussex, WI (US); David R. Bauer, Delafield, WI (US); Michael E. Weber, Hartland, WI (US); Eric X. Fernandes, Franklin, WI (US); David Hlavac, Germantown, WI (US); Michael L. Welliver, Milwaukee, WI (US); Daniel H. Schneider, Franklin, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 151 days.

This patent is subject to a terminal disclaimer.

(21) Appl. No.: 12/399,841

(22) Filed: Mar. 6, 2009

(65) Prior Publication Data

US 2009/0199689 A1 Aug. 13, 2009

Related U.S. Application Data

(63) Continuation-in-part of application No. 11/107,384, filed on Apr. 15, 2005, now Pat. No. 7,798,041.

(60) Provisional application No. 61/034,798, filed on Mar. 7, 2008, provisional application No. 60/562,592, filed on Apr. 15, 2004, provisional application No. 60/608,851, filed on Sep. 10, 2004.

(51) Int. Cl.
*B23D 45/04* (2006.01)

(52) U.S. Cl. .......... 83/471.3; 83/490
(58) Field of Classification Search ............ 83/471.3, 83/473, 490, 581
See application file for complete search history.

(56) References Cited

U.S. PATENT DOCUMENTS 2,559,283 A   7/1951   Dick, Jr.
(Continued)

FOREIGN PATENT DOCUMENTS

GB       2304076 A     8/1996

OTHER PUBLICATIONS

International Search Report and Written Opinion for International Application No. PCT/US05/12861 mailed Sep. 6, 2006.

(Continued)

*Primary Examiner* — Kenneth E. Peterson
(74) *Attorney, Agent, or Firm* — Michael Best & Friedrich LLP (57) ABSTRACT

A power tool includes a base, a table supported by the base for pivoting movement about an axis, a coarse adjustment assembly between the base and the table, and a fine adjustment assembly between the base and the table. The fine adjustment assembly includes a rotating member supported by one of the base and the table, and an engagement surface provided by the other of the base and the table. The rotating member is selectively engageable with and rotatable along the engagement surface to finely adjust the angular position of the table relative to the base. The angular position of the table relative to the base is coarsely adjustable using the coarse adjustment assembly when the rotating member is disengaged from the engagement surface. The fine adjustment assembly disengages the coarse adjustment assembly and maintains the coarse adjustment assembly disengaged when the rotating member is engaged with the engagement surface.

10 Claims, 9 Drawing Sheets

U.S. PATENT DOCUMENTS

| | | |
|---|---|---|
| 2,884,965 A | 5/1959 | Stahl |
| 3,049,032 A | 8/1962 | Schabot |
| 3,049,193 A | 8/1962 | Ingersoll |
| 3,085,452 A | 4/1963 | Thompson |
| 3,275,044 A | 9/1966 | Kisling |
| 3,565,135 A | 2/1971 | Rosenthal, Jr. et al. |
| 3,821,918 A | 7/1974 | Niehaus et al. |
| 3,931,743 A | 1/1976 | Valdettaro |
| 3,998,121 A | 12/1976 | Bennett |
| 4,011,782 A | 3/1977 | Clark et al. |
| 4,152,961 A | 5/1979 | Batson |
| 4,245,533 A | 1/1981 | Batson |
| 4,384,502 A | 5/1983 | Dover |
| 4,537,105 A | 8/1985 | Bergler |
| 4,638,700 A | 1/1987 | Fushiya et al. |
| 4,641,557 A | 2/1987 | Steiner et al. |
| 4,721,017 A | 1/1988 | Jorgensen et al. |
| 4,934,233 A | 6/1990 | Brundage et al. |
| 5,020,406 A | 6/1991 | Sasaki et al. |
| 5,042,348 A | 8/1991 | Brundage et al. |
| 5,046,390 A | 9/1991 | Sasaki |
| 5,054,352 A | 10/1991 | Fushiya et al. |
| 5,063,805 A | 11/1991 | Brundage |
| 5,207,141 A | 5/1993 | Dehari |
| 5,220,857 A | 6/1993 | Freeburger |
| 5,249,496 A | 10/1993 | Hirsch et al. |
| 5,265,511 A | 11/1993 | Itzov |
| 5,383,382 A | 1/1995 | Garuglieri et al. |
| 5,425,294 A | 6/1995 | Ushiwata et al. |
| 5,564,323 A | 10/1996 | Sasaki et al. |
| 5,595,124 A | 1/1997 | Wixey et al. |
| 5,791,224 A | 8/1998 | Suzuki et al. |
| 5,819,623 A | 10/1998 | Sasaki et al. |
| 5,819,624 A | 10/1998 | Brault et al. |
| 5,862,732 A | 1/1999 | Itzov |
| 5,865,079 A | 2/1999 | Itzov |
| 5,870,939 A | 2/1999 | Matsubara |
| 6,016,732 A | 1/2000 | Brault et al. |
| 6,289,778 B1 | 9/2001 | Wixey |
| 6,431,042 B1 | 8/2002 | Brault et al. |
| 6,474,206 B1 | 11/2002 | Brunson |
| 6,474,207 B1 | 11/2002 | Itzov |
| 6,513,412 B2 | 2/2003 | Young |
| 6,658,977 B2 | 12/2003 | Chang |
| 6,662,697 B1 | 12/2003 | Chen |
| 6,779,428 B2 | 8/2004 | Kao |
| 7,798,041 B2 * | 9/2010 | Hetcher et al. ............... 83/471.3 |
| 2001/0000856 A1 | 5/2001 | O'Banion |
| 2001/0001375 A1 * | 5/2001 | Meredith et al. ............. 83/471.3 |
| 2001/0042429 A1 | 11/2001 | Brunson et al. |
| 2002/0020265 A1 | 2/2002 | Gass et al. |
| 2002/0059853 A1 | 5/2002 | Gass et al. |
| 2002/0059854 A1 | 5/2002 | Gass et al. |
| 2002/0059855 A1 | 5/2002 | Gass et al. |
| 2002/0166433 A1 | 11/2002 | Ceroll et al. |
| 2003/0015078 A1 | 1/2003 | Taylor |
| 2003/0037656 A1 | 2/2003 | Brunson |
| 2003/0110914 A1 | 6/2003 | Brazell et al. |
| 2003/0200852 A1 | 10/2003 | Romo |
| 2004/0154448 A1 | 8/2004 | Romo et al. |
| 2005/0241452 A1 | 11/2005 | Bergmann |
| 2005/0284276 A1 | 12/2005 | Talesky et al. |
| 2006/0000331 A1 | 1/2006 | Ozawa et al. |
| 2007/0234864 A1 | 10/2007 | Bettacchini |

OTHER PUBLICATIONS

Milwaukee Electric Sales Catalog 194 "Heavy-Duty Electric Tools for Contractors & Industry", 1994, pp. 60-61, 76.

Delta Machinery, Sidekick 10" Compound Slide Saw (Models 36-240 and 36-250) Instruction Manual, 2001, U.S.A.

Hitachi, C12FSA 12" Sliding Dual Compound Miter Saw, Official Hitachi Sell Sheet, http://www.hitachi.us/Apps/hitachicom/content.jsp?page=WoodworkingTools/MiterSaws/details/C12FSA, at least as early as Sep. 15, 2003.

Makita, LS1212-12" Dual Slide Compound Saw, Instruction Manual, 1999, and http://www.makita.com/tools_Item_View.asp?id=299, Sep. 15, 2003, USA.

Dewalt, Heavy-Duty 12" (305mm) Double-Bevel Sliding Compound Miter Saw—DW708, http://www.dewalt.com//us/products/tool_detail_print.asp?productID+4741, Sep. 15, 2003.

* cited by examiner

MITER ADJUSTMENT ASSEMBLY FOR A SAW

RELATED APPLICATIONS

This application claims priority to U.S. Provisional Patent Application Ser. No. 61/034,798 filed on Mar. 7, 2008, the entire content of which is incorporated herein by reference.

This application is also a continuation-in-part of U.S. patent application Ser. No. 11/107,384 filed on Apr. 15, 2005, now U.S. Pat. No. 7,798,041, which claims priority to expired U.S. Provisional Patent Application Ser. No. 60/608,851 filed on Sep. 10, 2004 and expired U.S. Provisional Patent Application Ser. No. 60/562,592 filed on Apr. 15, 2004, the entire contents of which are incorporated herein by reference.

BACKGROUND OF THE INVENTION

This invention relates generally to power tools and, more particularly, to saws, such as miter saws, chop saws, etc.

When using a miter saw, an operator sometimes needs to adjust a cut slightly from a known or unknown starting angle (e.g., an angle corresponding to a pre-set miter detent position, the angle used for earlier cuts on associated work pieces, etc.). With conventional miter saws, the operator must slightly move the table in small angular increments (e.g., by gently tapping the side of the table). This may not be an accurate or repeatable method for making a slight angular change. Furthermore, several motions are usually involved in locking and unlocking the table to the base in a conventional miter saw to prevent movement of the table once the angle is set. Therefore, extra effort may be required by an operator who needs to make an angle adjustment at or near a detent in a conventional miter saw.

SUMMARY OF THE INVENTION

The present invention provides, in one aspect, a power tool including a base supportable on a surface to support the power tool on the surface, a table supported by the base for pivoting movement about an axis, a coarse adjustment assembly between the base and the table and operable to coarsely adjust an angular position of the table relative to the base and secure the table relative to the base in at least one selected angular position, and a fine adjustment assembly between the base and the table and operable to finely adjust an angular position of the table relative to the base. The fine adjustment assembly includes a rotating member supported by one of the base and the table, and an engagement surface provided by the other of the base and the table. The rotating member is selectively engageable with and rotatable along the engagement surface to finely adjust the angular position of the table relative to the base. The angular position of the table relative to the base is coarsely adjustable using the coarse adjustment assembly when the rotating member is disengaged from the engagement surface. The fine adjustment assembly disengages the coarse adjustment assembly and maintains the coarse adjustment assembly disengaged when the rotating member is engaged with the engagement surface.

The present invention provides, in another aspect, a power tool including a base supportable on a surface to support the power tool on the surface, a table supported by the base for pivoting movement about an axis, and a detent assembly operable to position the table relative to the base in a selected angular position. The detent assembly includes a detent projection supported on one of the base and the table and a detent recess defined by the other of the base and the table. The projection is engageable in the recess to position the table relative to the base in the selected angular position. The power tool also includes a fine adjustment assembly between the base and the table and operable to finely adjust the angular position of the table relative to the base. The fine adjustment assembly includes a rotating member supported by one of the base and the table and an engagement surface provided by the other of the base and the table. The rotating member is selectively engageable with and rotatable along the engagement surface to finely adjust the angular position of the table relative to the base. The fine adjustment assembly also includes a detent override assembly operable to disengage the detent projection from the detent recess and hold the detent projection out of engagement with the detent recess when the rotating member is engaged with the engagement surface.

Other features and aspects of the invention will become apparent by consideration of the following detailed description and accompanying drawings.

Before any features and at least one embodiment of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting.

DETAILED DESCRIPTION

Figure 1:
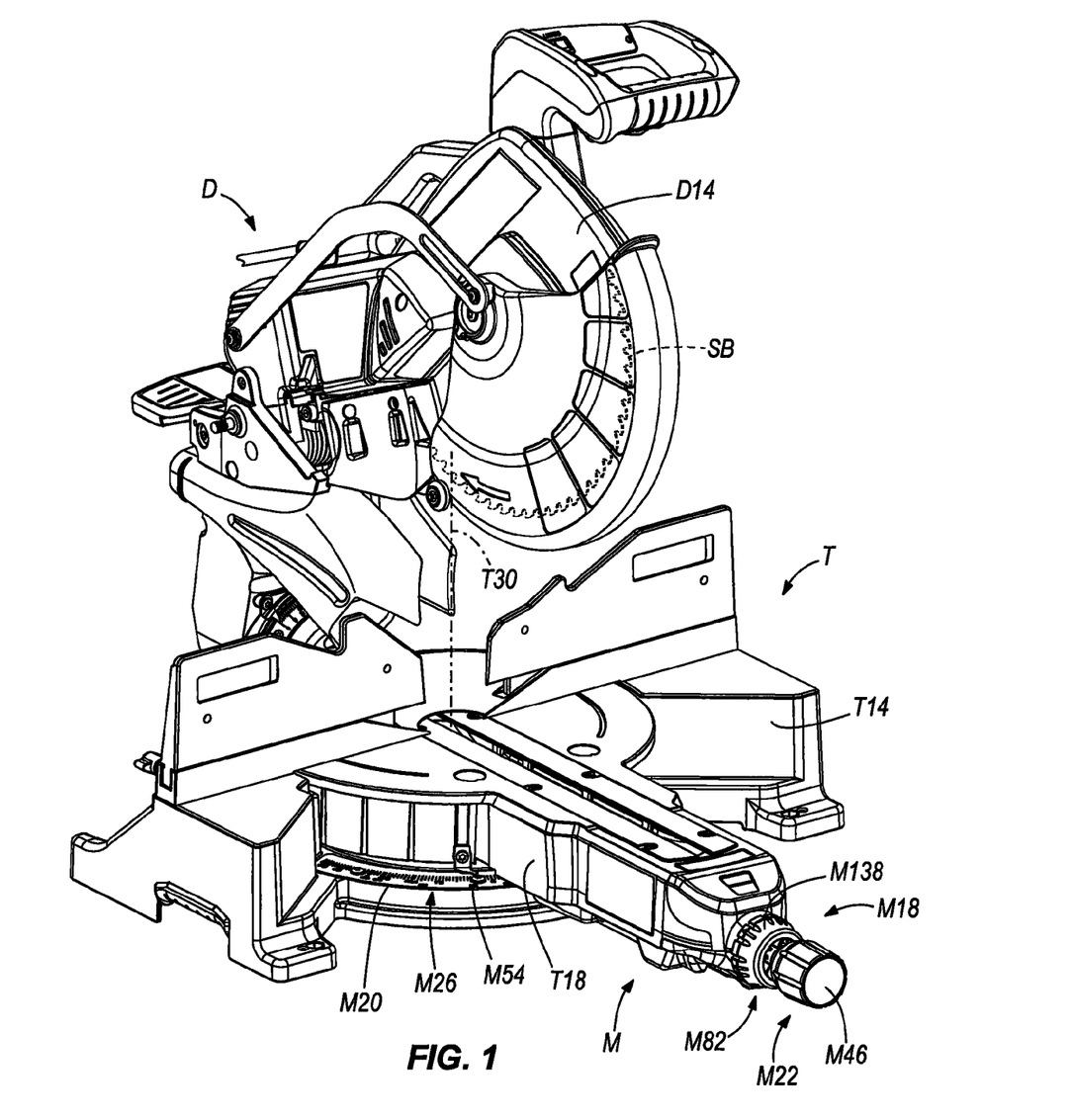
FIG. 1 is a front perspective view of a miter saw of the present invention incorporating a miter angle fine-adjustment assembly.

With reference to FIG. 1, a miter saw including a base and table assembly T is shown having a base T14 and a table T18 for supporting a work piece. The base and table assembly T supports a drive assembly D operable to drive a saw blade SB to cut a work piece supported on the base and table assembly T. The drive assembly D includes a saw unit D14 (including the saw blade SB), a motor, and a drive train operable to drive the saw blade SB. Such a drive assembly D is disclosed in U.S. patent application Ser. No. 11/107,384, filed Apr. 15, 2005, the entire content of which is incorporated herein by reference.

With continued reference to FIG. 1, the table T18 is coupled to the base T14 for pivoting movement about a generally vertical miter axis T30. The drive assembly D and the saw blade SB are coupled to the table T18 for pivoting movement with the table T18 relative to the base T14 to allow the saw blade SB to perform various angled miter cuts on a work piece supported on the table T18 and/or on the base T14.

The table and base assembly T includes a miter adjustment assembly M providing for adjustment of the angle of the saw blade SB relative to a work piece and the base T14 about the miter axis T30. With reference to FIGS. 2-9, the miter adjustment assembly M includes a coarse adjustment assembly M14 for making relatively large angular adjustments of the miter angle, and a fine adjustment assembly M18 for making accurate and/or repeatable incremental adjustments of the miter angle. The miter angle is indicated on a miter scale M20 coupled to the base T14 (see FIGS. 1 and 3).

Figure 3:
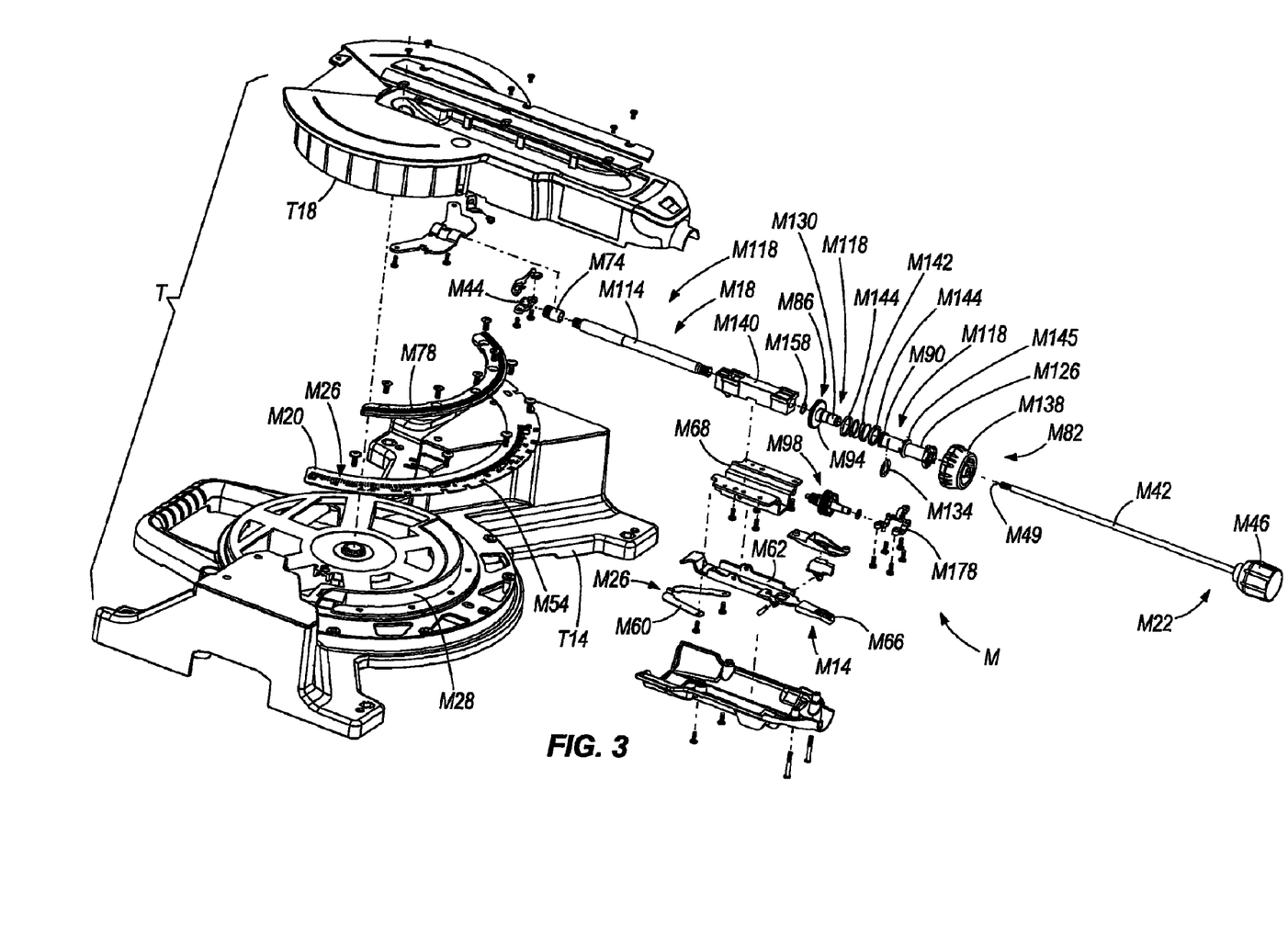
FIG. 3 is an exploded, perspective view of the table, base, and miter angle fine-adjustment assembly of FIG. 1.
Figure 7:
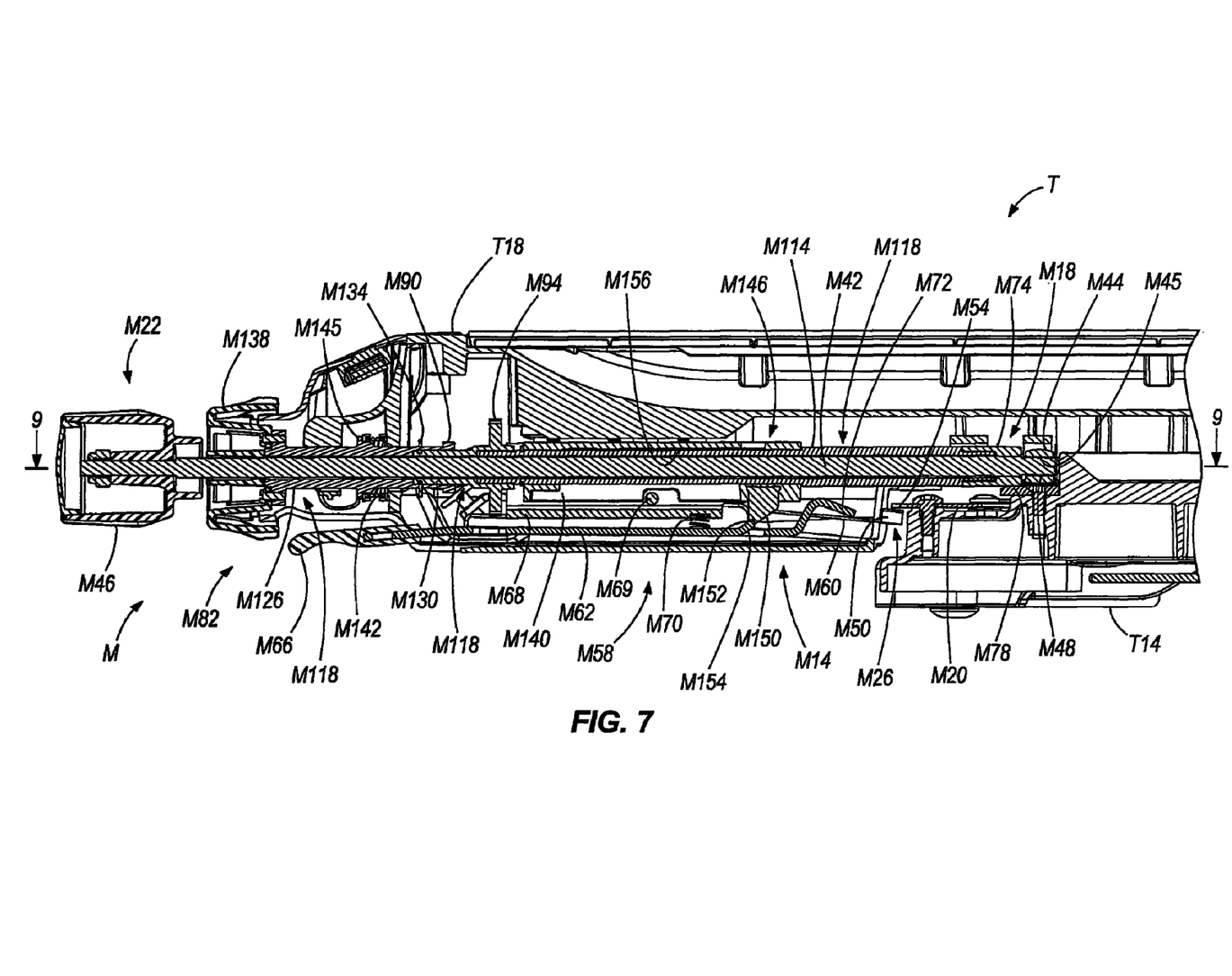
FIG. 7 is a cross-sectional view of the table, base, and miter angle fine-adjustment assembly of FIG. 1 along section 7-7 in FIG. 2, illustrating the miter angle fine-adjustment assembly engaged with the base.
Figure 8:
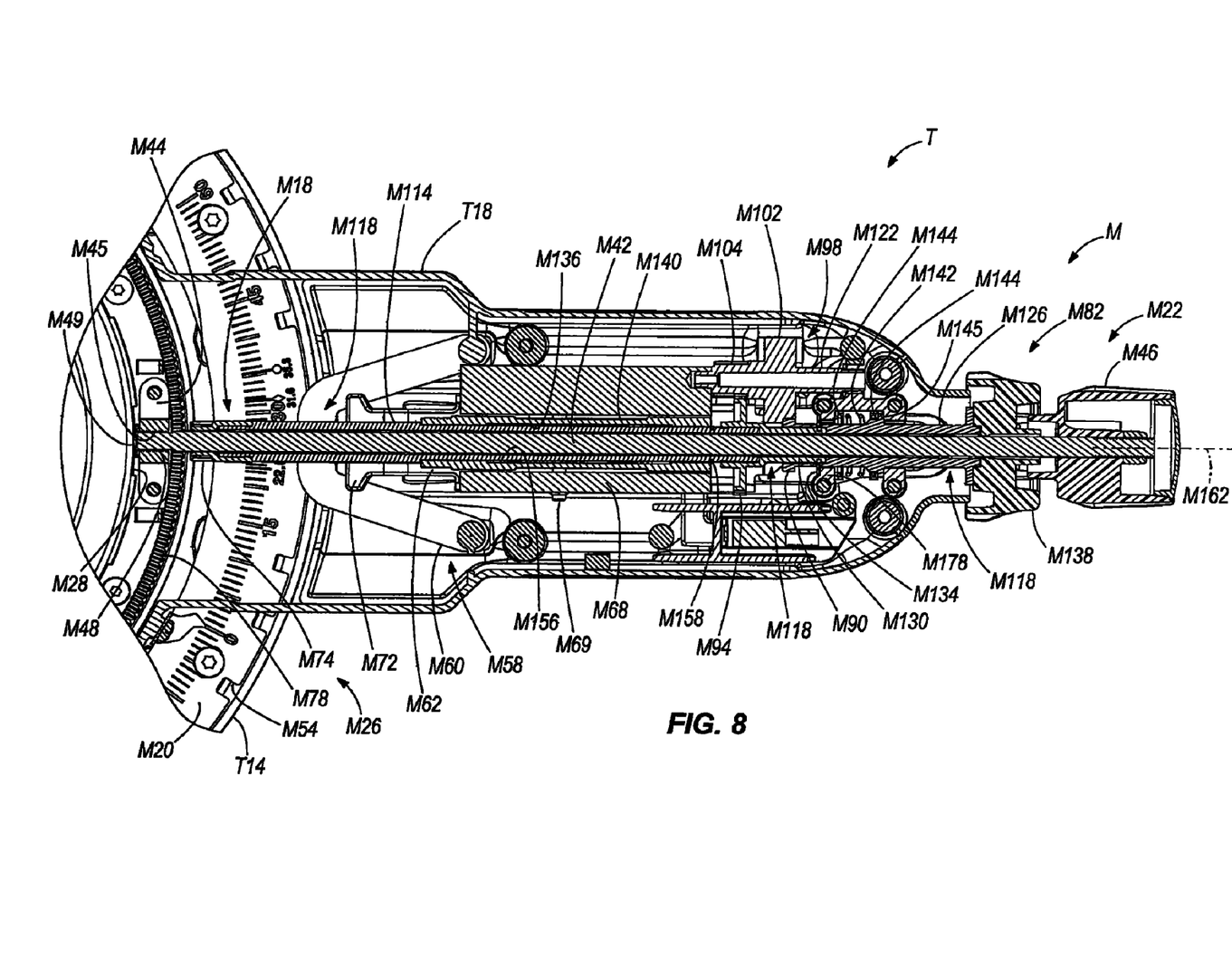
FIG. 8 is a cross-sectional view of the table, base, and miter angle fine-adjustment assembly of FIG. 1 along section 8-8 in FIG. 6, illustrating the miter angle fine-adjustment assembly disengaged from the base.
Figure 9:
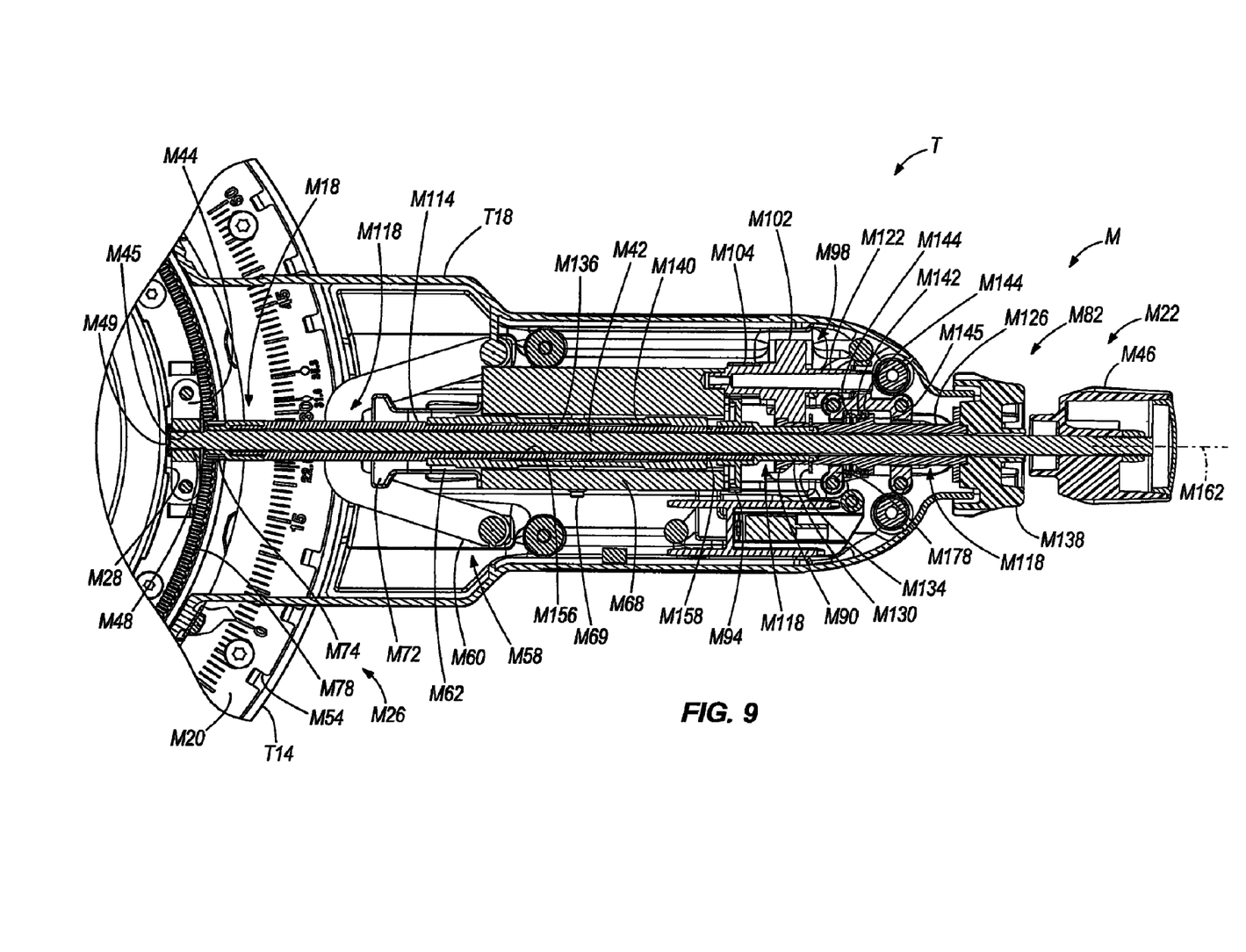
FIG. 9 is a cross-sectional view of the table, base, and miter angle fine-adjustment assembly of FIG. 1 along section 9-9 in FIG. 7, illustrating the miter angle fine-adjustment assembly engaged with the base.

With reference to FIG. 3, the coarse adjustment assembly M14 includes a miter locking assembly M22 and a miter detent assembly M26. The miter locking assembly M22 enables the operator to lock the table T18 in substantially any available miter angle position relative to the base T14. The miter locking assembly M22 includes a lock bolt M42, a knob M46 secured to one end of the lock bolt M42, and a plurality of external threads M48 formed on an end of the bolt M42 opposite the knob M46 (see FIGS. 6 and 7). The miter locking assembly M22 also includes a mounting block M44 coupling the threaded end of the bolt M42 to the table T18. The block M44 includes a plurality of internal threads M45 that engage the external threads M48 on the bolt M42, such that rotation of the bolt M42 relative to the block M44 also axially displaces the bolt M42 relative to the block M44. With reference to FIGS. 8 and 9, the bolt M42 includes an end surface M49 in facing relationship with an arcuate wall M28 on the base T14. During operation of the table and base assembly T, the knob M46 and bolt M42 are rotated between a first or locked position, in which the end M49 of the bolt M42 engages the wall M28 to rotationally secure the table T18 relative to the base T14, and a second or unlocked position, in which the end M49 of the bolt M42 is spaced from the wall M28 to allow the table T18 to be rotated relative to the base T14 to change the miter angle.

To unlock the table T18 from the base T14, starting from the locked position, the knob M46 need only be rotated in a counterclockwise direction to axially displace the bolt M42 relative to the block M44, thereby disengaging the end M49 of the bolt M42 from the wall M28. A user may then adjust the position of the table T18 to the left or the right to any available miter angle position. To re-lock the table T18 to the base T14, the knob M46 need only be rotated in a clockwise direction to axially displace the bolt M42 relative to the block M44, thereby engaging the end M49 of the bolt M42 and the wall M28.

Figure 2:
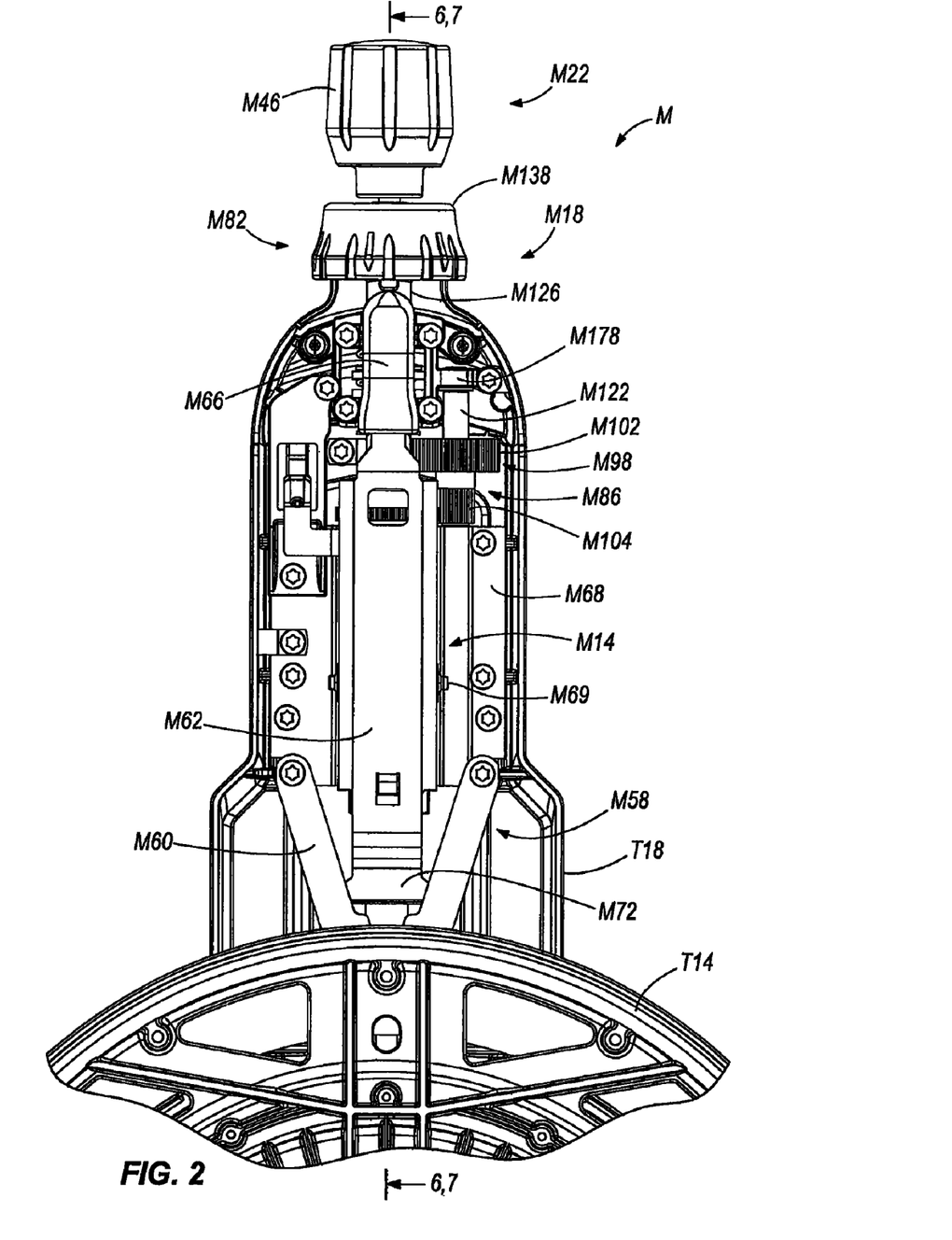
FIG. 2 is a bottom view of a table, base, and miter angle fine-adjustment assembly of the miter saw of FIG. 1.

With reference to FIGS. 2 and 3, the miter detent assembly M26 provides the user with an arrangement to position the table T18 in one or more selected miter angle positions relative to the base T14 (e.g., 0 degrees; left 15 degrees, 22.5 degrees, 30 degrees and 45 degrees; right 15 degrees, 22.5 degrees, 30 degrees, 45 degrees, and 60 degrees; etc.). The assembly M26 includes a detent projection M50 (see FIGS. 6 and 7) that is selectively engageable in one or more detent notches or recesses M54, each of which corresponds to a selected miter angle position on the miter scale M20. In the illustrated construction, the recesses M54 are provided on the base T14 (e.g., formed on the miter scale M20), and the projection M50 is supported by the table T18.

The miter detent assembly M26 also includes a detent actuator assembly M58 for moving the projection M50 between a detent engaged position (see FIG. 6), in which the projection M50 engages a recess M54, and an out-of-detent or detent disengaged position (see FIG. 7), in which the projection M50 is not engaged with a recess M54. The assembly M58 includes a resilient member or leaf spring M60 having a distal end to which the projection M50 is coupled, a lever M62 pivotably coupled to the table T18 to deflect the leaf spring M60 between the detent engaged position and the detent disengaged position, and a handle M66 coupled to the lever M62. In the illustrated construction, the projection M50 is integrally formed with the leaf spring M60, and the leaf spring M60 is coupled to the table T18 by a plurality of fasteners (e.g., screws, bolts, etc.) via a bracket M68 (discussed in more detail below). Alternatively, the leaf spring M60 may be integrally formed with the table T18 or the bracket M68 and pivotable relative to the table T18 or the bracket M68 by a living hinge or different structure.

Figure 6:
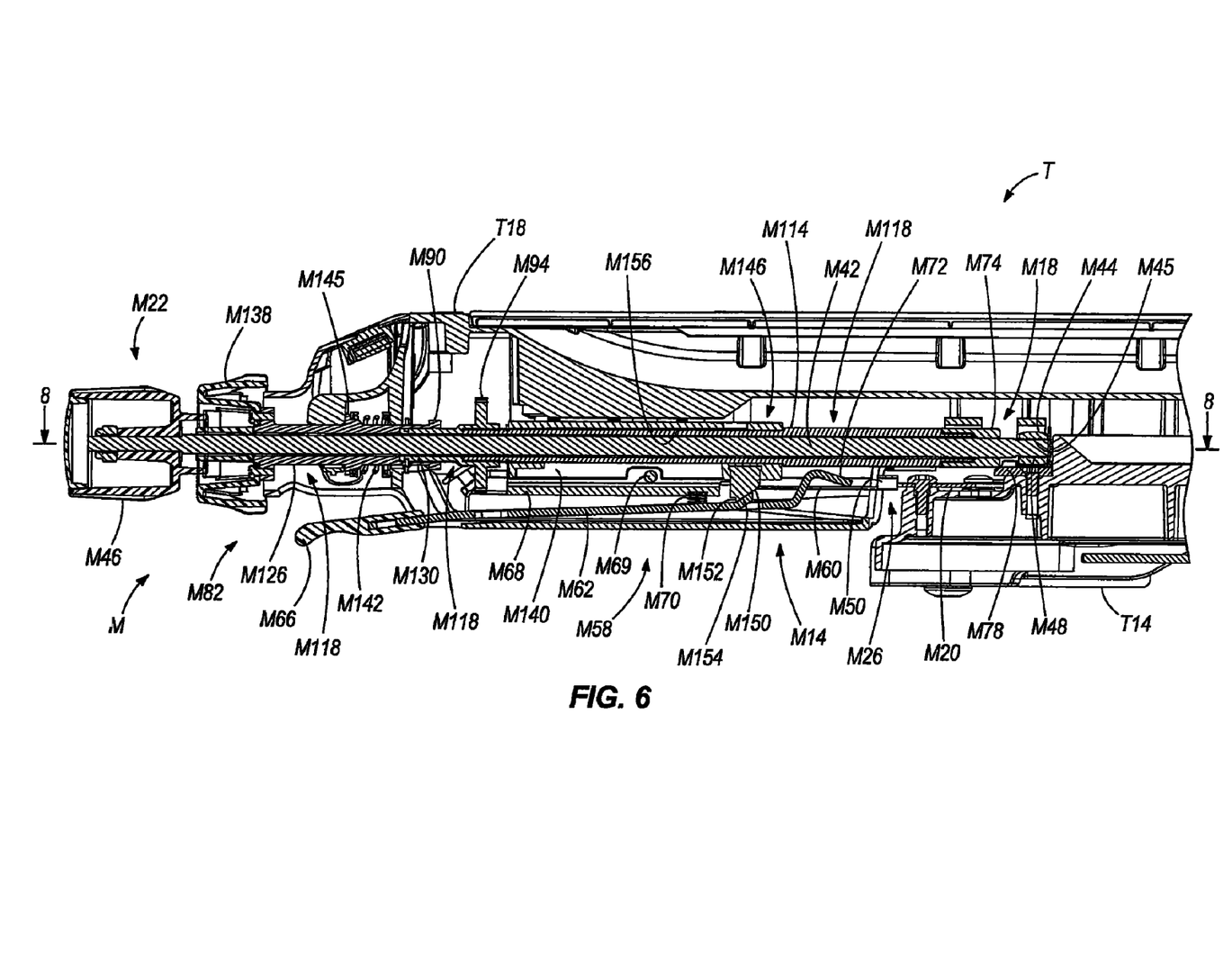
FIG. 6 is a cross-sectional view of the table, base, and miter angle fine-adjustment assembly of FIG. 1 along section 6-6 in FIG. 2, illustrating the miter angle fine-adjustment assembly disengaged from the base.

The detent actuator assembly M58 includes the previously-mentioned bracket M68 (see FIG. 3) coupled to an interior surface of the table T18 (e.g., by a plurality of fasteners, by an adhesive, etc.). A middle portion of the lever M62 is pivotably coupled to the bracket M68 by a pin M69 (see FIGS. 6 and 7), while a tip M72 of the lever M62 engages the leaf spring M60. Alternatively, the lever M62 may be integrally formed with the bracket M68 and pivotable relative to the table T18 by a living hinge or different structure. A biasing member (e.g., a spring M70) biases the projection M50 toward the detent engaged position. With reference to FIGS. 6 and 7, the spring M70 is configured as a tension spring M70, and is positioned between the bracket M68 and the lever M62 to bias the lever M62 to a position corresponding to the detent engaged position.

Before operating the detent assembly M26, the user would first unlock the table T18 from the base T14, as described above with respect to the miter locking assembly M22. The user then lifts the handle M66 to lift the projection M50 out of the recess M54. The user then adjusts the position of the table T18 to the left or the right to the desired miter angle position. If the user continues to lift upwardly on the handle M66, thereby overcoming the biasing force of the spring M70, the leaf spring M60 will be maintained in a deflected condition to prevent the projection M50 from engaging any of the recesses M54 in the miter scale M20 as the table T18 is rotated relative to the base T14. However, if the user releases the handle M66, the biasing force of the spring M70 will lift the tip M72 of the lever M62, allowing the leaf spring M60 to resume its undeflected shape, thereby causing the projection M50 to slide on the miter scale M20 and engage the next recess M54 encountered by the projection M50. The miter detent assembly M22, by itself, is sufficient to hold or maintain the table T18 in the selected miter angle position. However, the user may also actuate the miter locking assembly M22 to more positively lock the table T18 to the base T14.

With reference to FIGS. 8 and 9, the fine adjustment assembly M18 generally includes inter-engaging members that are movable relative to each other to cause small incremental movement of the table T18 relative to the base T14. Specifically, the fine adjustment assembly M18 includes a rotating member (e.g., a pinion M74) that moves along a surface (e.g., a rack M78) upon rotation of the pinion M74. Alternatively, the fine adjustment assembly M18 may utilize a pad and friction roller in place of the rack M78 and pinion M74. The rack M78 is supported by the base T14 rearward of the miter scale M20 and has an arcuate shape. In the illustrated construction, the rack M78 is a separate and distinct component coupled to the base T14 by a plurality of fasteners (see also FIG. 3). Alternatively, the rack M78 may be integrally formed with the base T14 as a single piece. With reference to FIGS. 6 and 7, the pinion M74 is supported by the table T18. Rotation of the pinion M74 relative to the table T18, with the pinion M74 engaged to the rack M78, incrementally rotates the table T18 relative to the base T14 about the miter axis T30 to fine adjust the miter angle.

The fine adjustment assembly M18 also includes a drive assembly M86 (see FIGS. 4 and 5) operable to deliver torque to the pinion M74 to cause the pinion M74 to rotate. In the illustrated construction, the drive assembly M86 includes a drive gear M90, a driven gear M94, and a gear reduction assembly M98, including co-rotating gears M102, M104. The gear reduction assembly M98 is configured to provide a speed reduction and a resultant increase in torque between the drive gear M90 and the driven gear M94 which, ultimately, is fixed for co-rotation with the pinion M74. In the illustrated construction, the gear reduction assembly M98 includes a speed reduction ratio of about 88:1, such that about 88 revolutions of the drive gear M90 are required to complete about a single revolution of the driven gear M94. Alternatively, the gear reduction assembly M98 may be configured to provide any of a number of different speed reduction ratios between the drive gear M90 and the driven gear M94. For example, the speed reduction ratio may be in within a range of about 80:1 to about 100:1, such as at a speed reduction ratio of about 90:1.

Figure 4:
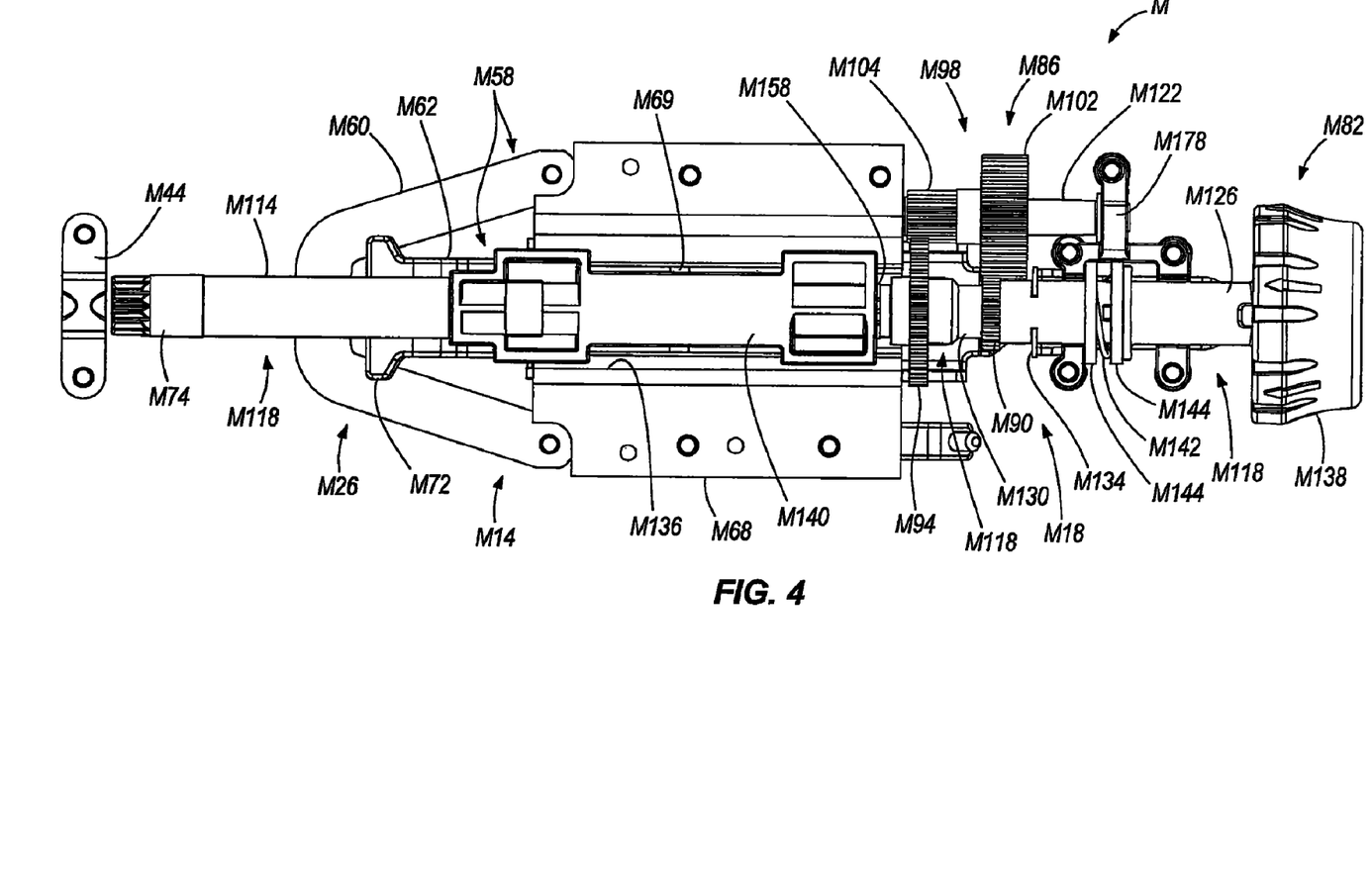
FIG. 4 is a top view of the miter angle fine-adjustment assembly of FIG. 1.
Figure 5:
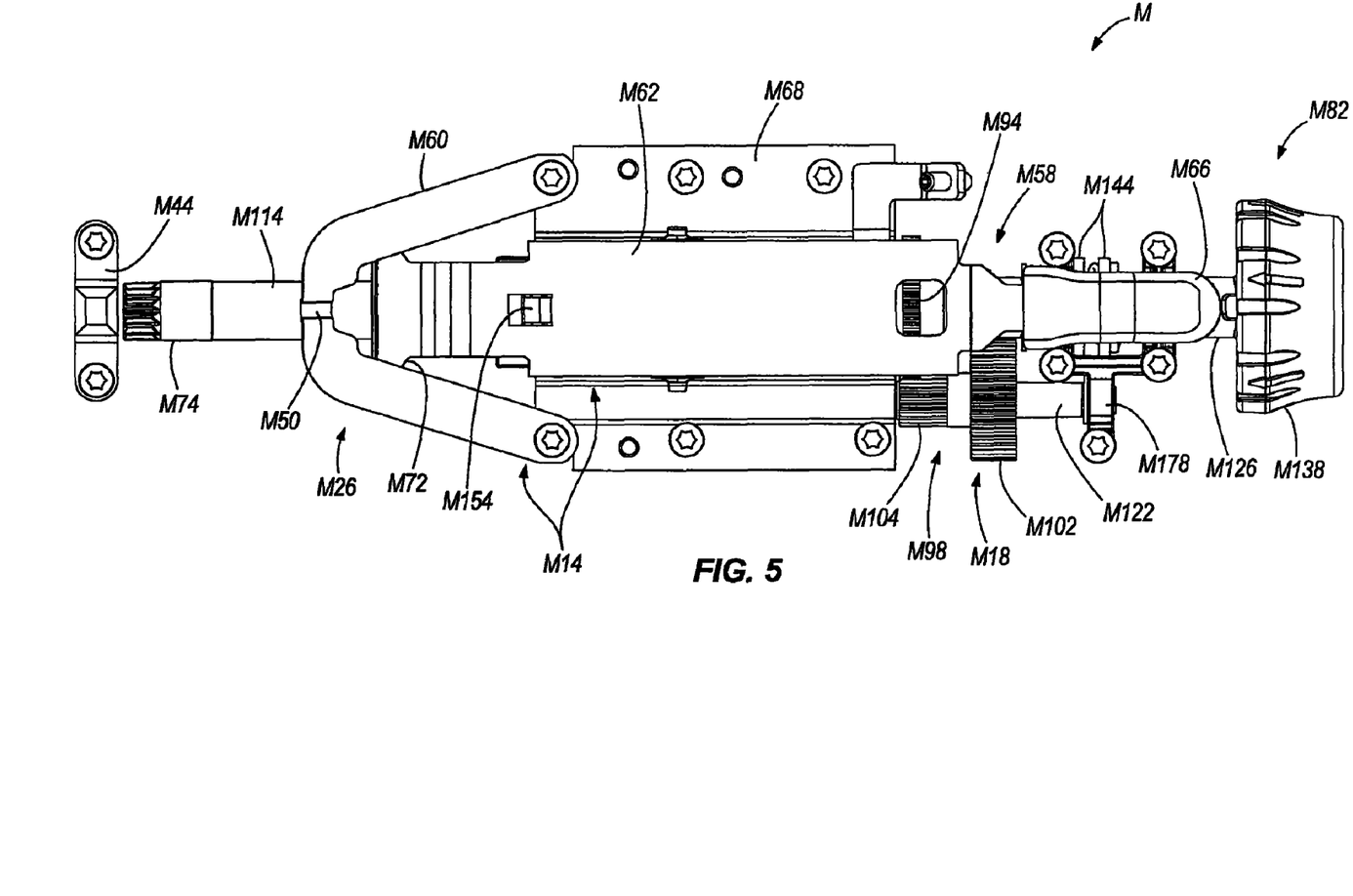
FIG. 5 is a bottom view of the miter angle fine-adjustment assembly of FIG. 1.

With reference to FIGS. 4 and 8, the pinion M74 and the gears M90, M94 are coupled to a tube assembly M118, and the co-rotating gears M102, M104 are coupled to a gear reduction tube M122. Specifically, the drive gear M90 is carried by a drive gear tube M126, the driven gear M94 is carried by a driven gear tube M130, and the pinion M74 is carried by a pinion tube M114. In the illustrated construction, the pinion M74 is a separate and distinct component from the tube M114 that is fixed for co-rotation with the tube M114 (e.g., by an interference fit, adhesives, a key and keyway arrangement, etc.). Alternatively, the pinion M74 may be integrally formed with the tube M114.

With reference to FIGS. 3 and 8, the pinion tube M114 may be axially secured to the driven gear tube M130 (e.g., by an interference or press-fit, using adhesives, etc.), such that the tubes M114, M130 are axially moveable together as a unit. Alternatively, the pinion tube M114 may be axially biased toward the driven gear tube M130 (e.g., by the interaction of the spring M70, lever M62, and slide block M140 as discussed below). In addition, the tubes M114, M130 are fixed to each other for co-rotation (e.g., by inter-engaging flat surfaces, a key and keyway arrangement, etc.). With continued reference to FIGS. 3 and 8, the driven gear tube 130 is axially secured to the drive gear tube M126 by a clip M134, such that the tubes M126, M130 are axially moveable together as a unit. However, the tube M126 is rotatable relative to the tube M130 due to the speed reduction imparted to the tube M130 and the driven gear M94 by the gear reduction assembly 98.

With reference to FIGS. 3-5, 8, and 9, a bushing M178 rotatably couples the tube M126 to the table T18 and maintains axial alignment of the drive gear tube M126 with the pinion tube M114. The bushing M178 also supports one end of the gear reduction tube M122, with the other end of the tube M122 being rotatably supported by the bracket M68 (see FIGS. 8 and 9), to maintain the tube M122 substantially parallel to the tubes M126, M130, M114. Alternatively, the tubes M122, M126 may be supported by the table T18 in any of a number of different ways utilizing different structure.

In operation of the drive assembly M86, the pinion M74 is movable between a driving position, in which the pinion M74 and the rack M78 are engaged (see FIG. 9), and a disengaged position, in which the pinion M74 is slid out of engagement with the rack M78 (see FIG. 8). Also, the tube assembly M118 is movable relative to the gear reduction tube M122. With reference to FIGS. 8 and 9, the drive gear tube M126 and the gear M90 are slidable relative to the axially-fixed tube M122 and the axially-fixed gear M102. Likewise, the driven gear tube M130 and the gear M94 are slidable relative to the axially-fixed tube M122 and the axially-fixed gear M102. As shown in FIGS. 8 and 9, the respective gears M90, M102 and the respective gears M94, M104 remain engaged when the pinion M74 is engaged with the rack M78 (see FIG. 9) and when the pinion M74 is disengaged from the rack M78 (see FIG. 8). Alternatively, the drive assembly M86 may be configured to disengage the respective gears M90, M102, or the respective gears M94, M104, upon the pinion M74 disengaging the rack M78. The tubes M114, M126, M130 are axially slidable relative to the lock bolt M42, which extends through the tubes M114, M126, M130.

With reference to FIGS. 1-9, the fine adjustment assembly M18 also includes a fine adjustment actuator assembly M82 for causing rotating movement of the pinion M74 along the rack M78. The assembly M82 includes an actuator portion or knob M138 that is manipulated by the user to engage the drive assembly M86 and to operate the drive assembly M86 to fine adjust the miter angle. In the illustrated construction, the knob M138 is coupled to the tube M126 by a plurality of fasteners (e.g., screws, bolts, etc.; see FIGS. 6 and 7). Alternatively, the knob M138 may be integrally formed with the tube M126 as a single piece. With continued reference to FIGS. 6 and 7, the knob M138 is moved axially to engage the pinion M74 and the rack M78, and then is rotated to impart torque to the pinion M74 via the tubes M126, M122, M130, M114 to incrementally rotate the pinion M74 and subsequently the table T18.

The actuator assembly M82 also includes a biasing member (e.g., a spring M142; see FIGS. 3, 8, and 9) positioned between a retainer M144 abutted against the bushing M178 and another retainer M144 abutted against a radially-extending flange M145 on the tube M126. As shown in FIG. 8, the spring M142 biases the knob M138 axially away from the table T18. Because the knob M138 moves axially with the tubes M126, M130, M114 as a unit, axial displacement of the knob M138 away from the table T18 also disengages the pinion M74 from the rack M78. To engage the fine adjustment assembly M18, the knob M138 is axially displaced toward the table T18, against the bias of the spring M142.

With reference to FIGS. 3, 6, and 7, the drive assembly M86 also includes a detent override assembly M146 to disengage the projection M50 from the recesses M54 and hold the projection M50 out of engagement with the recesses M54. The detent override assembly M146 includes a slide block M140 received within a channel M136 formed in the bracket, a ramp M150 coupled to the slide block M140, and a notch M152 adjacent the ramp M150. Both the ramp M150 and the notch M152 are engageable with a portion (e.g., an upwardly-extending tab M154) of the lever M62. With reference to FIGS. 6 and 7, the slide block M140 includes an aperture M156 through which the tube M114 and the lock bolt M42 extend. As such, the slide block M140 rotatably supports the tube M114 and the lock bolt M42 relative to the table T18. Also, the slide block M140 is axially moveable along the channel M136 with the tubes M126, M130, M114. In the illustrated construction, a clip M158 coupled to the tube M114 is abutted with an end of the slide block M140, thereby causing the slide block M140 and the tube M114 to be axially displaced toward the rack M78 as a unit (see FIGS. 3, 4, 7, and 9) when the knob M138 is depressed. Further, the interaction of the ramp M150 and the tab M154, as discussed in more detail below, causes the slide block M140 (and therefore the pinion tube M114) to be axially displaced away from the rack M78 when the knob M138 is released.

In operation of the detent override assembly M146, the knob M138 is depressed toward the table T18, causing the tubes M126, M130, M114 and the slide block M140 to axially displace toward the rack M78 as a unit to engage the pinion M74 with the rack M78. As the slide block M140 is axially displaced along the channel M136, the ramp M150 slides relative to the tab M154, causing the tip M72 of the lever M62 to pivot downwardly and downwardly-deflect the leaf spring M60 to disengage the projection M50 from the recess M54 (see FIG. 7). Upon engagement of the tab M154 and the notch M152, the tip M72 of the lever M62 is prevented from pivoting upwardly to allow the leaf spring M60 to resume its undeflected shape to re-engage the projection M50 with one of the recesses M54. That is, the detent override assembly M146 holds the detent assembly M26 in the detent disengaged position. The user may then rotate the knob M138 to operate the drive assembly M86 to fine adjust the miter angle.

Engagement of the tab M154 in the notch M152 also maintains the drive assembly M86 in the fine adjust mode. Slight rearward pressure on the knob M138 is sufficient to disengage the tab M154 from the notch M152. The upward bias exerted on the lever M62 by the spring M70 causes the tab M154 to slide along the ramp M150 as the tip of the lever M62 pivots upwardly, thereby returning the projection M50 to a recess-engageable condition.

As shown in FIGS. 8 and 9, components of the miter locking assembly M22, the actuator assembly M82, the drive assembly M86, and the detent override assembly M146 are aligned and are moveable along a common axis M162. Specifically, with respect to the miter locking assembly M22, the lock bolt M42 and the knob M46 are moveable along the axis M162, relative to the table T18, to selectively lock the table T18 to the base T14. With respect to the actuator assembly M82, the knob M138 is moveable along the axis M162 to cause the pinion M74 to engage with the rack M78, and rotatable about the axis M162 to impart incremental rotation to the pinion M74. With respect to the drive assembly M86, the tubes M126, M130 and the respective gears M90, M94 are moveable along and rotatable about the axis M162, and the tube M114 and pinion M74 are moveable along and rotatable about the axis M162. With respect to the detent override assembly M146, the slide block is moveable along the axis M162 to selectively displace the projection M50 from the miter scale M20 to prevent the projection M50 from engaging any of the recesses M54 in the miter scale M20.

Although the invention has been described in detail with reference to certain preferred embodiments, variations and modifications exist within the scope and spirit of one or more independent aspects of the invention as described.

Various features of the invention are set forth in the following claims.

What is claimed is:

1. A power tool comprising:
    a base supportable on a surface to support the power tool on the surface;
    a table supported by the base for pivoting movement about an axis;
    a detent assembly operable to position the table relative to the base in a selected angular position, the detent assembly including
        a detent projection supported on one of the base and the table, and
        a detent recess defined by the other of the base and the table, the projection being engageable in the recess to position the table relative to the base in the selected angular position;
    a fine adjustment assembly between the base and the table and operable to finely adjust the angular position of the table relative to the base, the fine adjustment assembly including
        a rotating member supported by one of the base and the table,
        an engagement surface provided by the other of the base and the table, the rotating member being selectively engageable with and rotatable along the engagement surface to finely adjust the angular position of the table relative to the base, and
        a detent override assembly operable to disengage the detent projection from the detent recess in response to axial movement of the rotating member toward the engagement surface and hold the detent projection out of engagement with the detent recess when the rotating member is engaged with the engagement surface; and
    a lever coupled to the detent projection, wherein the detent override assembly includes a ramp, moveable in response to axial movement of the rotating member toward the engagement surface, upon which a portion of the lever slides to disengage the detent projection from the detent recess.

2. The power tool of claim 1, wherein the rotating member includes a pinion, wherein the engagement surface includes a rack, the pinion being engageable with and rotatable along the rack to finely adjust the angular position of the table relative to the base.

3. The power tool of claim 1, wherein the rotating member is supported by the table, and wherein the engagement surface is provided by the base.

4. The power tool of claim 1, wherein the fine adjustment assembly further includes an actuator assembly operable to cause movement of the rotating member relative to the engagement surface.

5. The power tool of claim 4, wherein the actuator assembly is operable to cause selective engagement of the rotating member and the engagement surface.

6. The power tool of claim 5, wherein the actuator assembly defines an axis, and wherein the rotating member is movable along the axis into and out of engagement with the engagement surface.

7. The power tool of claim 6, wherein the fine adjustment assembly includes a biasing member operable to bias the rotating element out of engagement with the engagement surface.

8. The power tool of claim 7, wherein the biasing member is supported between the actuator assembly and the one of the base and the table.

9. The power tool of claim 6, wherein the actuator assembly includes
    a shaft supporting the rotating element, the shaft being movable along the axis, and
    an actuator operable to move the shaft along the axis to cause the rotating element to move into and out of engagement with the engagement surface and to rotate the shaft to cause rotation of the rotating element relative to the engagement surface.

10. The power tool of claim 1, wherein the fine adjustment assembly further includes an actuator assembly operable to cause movement of the rotating member relative to the engagement surface, wherein the actuator assembly includes
a shaft supporting the rotating element and coupled to the ramp, the shaft and the ramp being movable along an axis of rotation of the shaft, and
an actuator operable to move the shaft along the axis to cause the rotating member to move into and out of engagement with the engagement surface and cause the lever to slide relative to the ramp to move the detent projection out of and into engagement with the detent recess, and wherein the actuator is operable to rotate the shaft to cause rotation of the rotating member relative to the engagement surface.

* * * * *